No. 640,220. Patented Jan. 2, 1900.
S. & E. PERLE & W. BUTTERMILCH.
LATHE.
(Application filed Mar. 10, 1898.)
(No Model.)
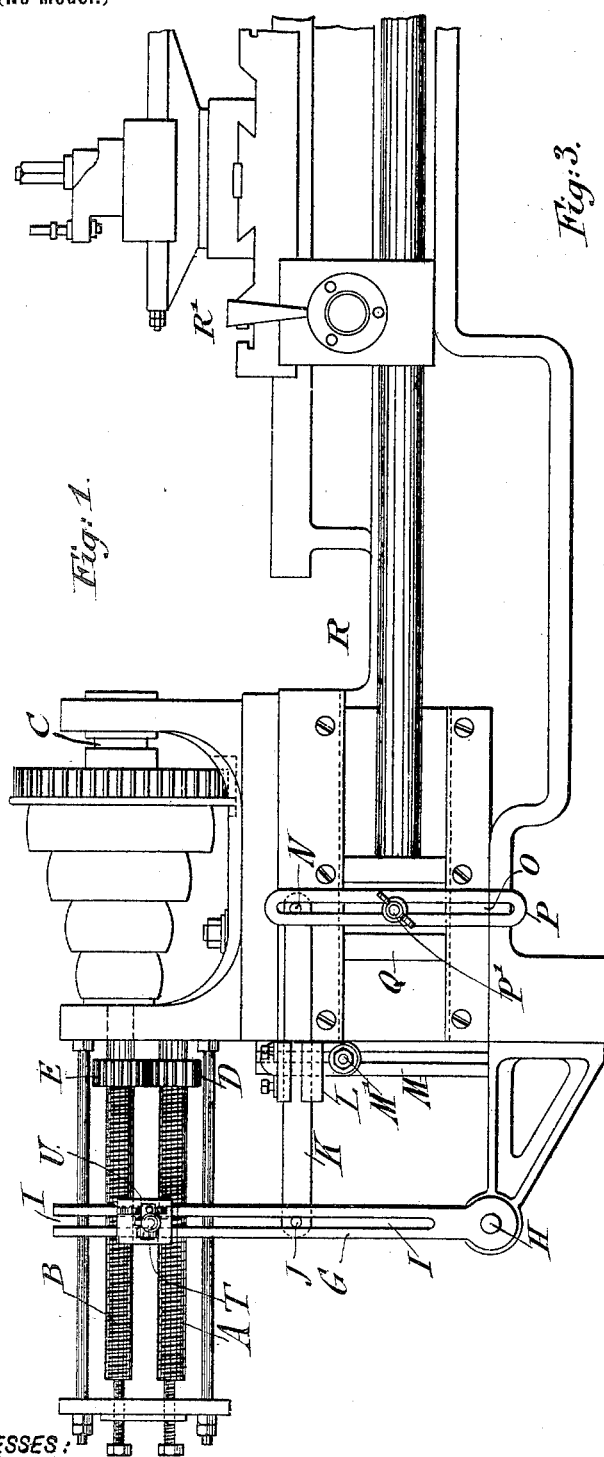
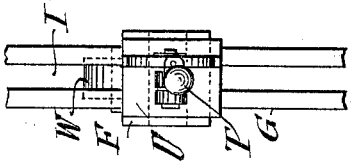
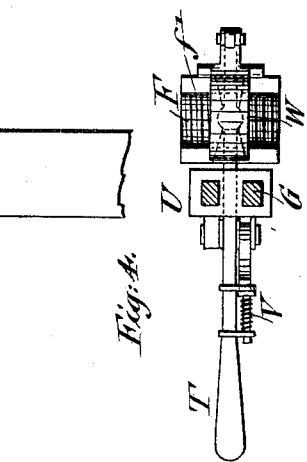
WITNESSES:
INVENTORS
Salomon Perle, Eugen Perle
and Wilhelm Buttermilch
BY
ATTORNEYS.

UNITED STATES PATENT OFFICE.

SALOMON PERLE, EUGEN PERLE, AND WILHELM BUTTERMILCH, OF BRESLAU, GERMANY.

LATHE.

SPECIFICATION forming part of Letters Patent No. 640,220, dated January 2, 1900.

Application filed March 10, 1898. Serial No. 673,361. (No model.)

*To all whom it may concern:*

Be it known that we, SALOMON PERLE, EUGEN PERLE, and WILHELM BUTTERMILCH, citizens of the German Empire, residing at Breslau, Germany, have invented certain new and useful Improvements in Lathes, of which the following is a specification.

This invention relates to lathes for cutting screw-threads; and the object of the invention is to provide a simple and readily-adjustable lathe for cutting screw-threads of any desired pitch and either right or left.

The invention consists of certain features of construction and combinations of parts to be hereinafter described, and then claimed.

In the accompanying drawings, Figure 1 is a side elevation of a portion of a lathe, showing our improvements. Fig. 2 is a detail side view of the nut and operating devices for the same. Fig. 3 is a front elevation, and Fig. 4 is a plan view, of the same parts.

Similar letters of reference indicate corresponding parts.

A B indicate two similar screw-spindles, of which B forms an extension of the live-spindle C, said screw-spindle being connected by intermeshing pinions D E and turning, therefore, in opposite directions. Between the screw-spindles A B is arranged a nut F, the opposite sides of which are provided with semicircular recesses $f$ $f'$, having screw-threads corresponding to the adjacent screw-spindles A B, respectively, against which the nut is adapted to be forced in mesh. Whenever the meshing of the nut F with the screw-spindle B takes place, a right-hand screw-thread will be cut, while when the meshing of the nut with the screw-spindle A takes place a left-hand screw-thread is produced.

The mechanism which enables the shifting of the nut F will be described subsequently.

The nut F is arranged movably upon a one-armed lever G, which has its fulcrum at H, and is provided with a longitudinal slot I, in which enters a stud or projection J of a connecting-rod K. This connecting-rod K is guided through a guide-box L, which is adjustable upon an upright rail M, fixed to the frame of the lathe, and is set in position by means of a screw or other suitable device M'. The guide-box L is so formed as that the connecting-rod K is always supported in horizontal position. At the inner end of the connecting-rod is a stud or projection N, which enters into a longitudinal slot O of a link P, which in any suitable manner, as by a screw P', is fastened to the cross-head Q of the rod R, which operates the slide-rest R'. Whenever one oscillation of the lever G is produced, then a longitudinal movement of the slide-rest R' takes place, and the distance of the longitudinal movement and the pitch of the thread to be cut will also depend upon the position of the connecting-rod K. The thread is more inclined when the guide-box L, with the connecting-rod K, is adjusted nearer the screw-spindles A B, while the inclination of the threads is made less when said parts are adjusted nearer the fulcrum H. In this way the movement of the slide-rest is properly timed to the desired pitch.

The nut F is fitted loosely upon a spherical head S of a hand-lever T, which extends through said nut and which is arranged to turn on a slide U, that is arranged on the lever F. In consequence of the provision of the spherical head S the nut F can self-adjust itself in such way as that in every position of the lever F it will have a correct position upon either of the screw-spindles A B. By the movement of the lever T the nut F can be caused to mesh either with the screw-spindle A or B. Whenever the nut F is in mesh with one of the screw-spindles, the lever T is locked in position by means of a spring-actuated locking-pin V, adapted to enter one of several notches in a segment V'.

As it might happen that the slide U, with the supported parts, would drop by its own weight as soon as the meshing of the nut F with the upper screw-spindle B takes place, and consequently disconnect the nut from said spindle, the nut is provided with a pivoted claw or hook W, which engages the screw-spindle B from above and prevents the accidental dropping of said nut. This claw or hook W is connected with the inner end of the hand-lever T by means of a short link X, so that by the lowering of the handle of the said lever the said claw is forced down upon the screw-spindle B. When the handle of the lever T is raised, an upward movement of the claw or hook is produced, so that it is disconnected from the screw-spindle B, and the nut F is then engaged with the lower screw-spindle A.

Having thus described our invention, what we claim is—

1. In a lathe, the combination of two similar screw-spindles, one of which is an extension of the live-spindle, gearing connecting the two screw-spindles so as to turn them in opposite directions, a nut arranged between said screw-spindles, and adapted to mesh with one or the other, a lever on which said nut is movably mounted, and suitable connections extending from said lever to the slide-rest, substantially as set forth.

2. In a lathe, the combination of two similar screw-spindles, one of which is an extension of the live-spindle, gearing connecting the screw-spindles, a nut arranged between said screw-spindles, a lever on which said nut is movably mounted so as to mesh with either of said screw-spindles, a rod extending from the slide-rest, a link connected with said rod, and a connecting-rod between said lever and link, substantially as set forth.

3. In a lathe, the combination of two similar screw-spindles, the upper one of which is an extension of the live-spindle, gearing connecting the screw-spindles, a nut between the latter, a lever on which the nut is loosely mounted, means for retaining the nut in mesh with the upper screw-spindle, and suitable connections extending from said lever to the slide-rest, substantially as set forth.

In witness whereof we have hereunto set our hands in presence of two witnesses.

SALOMON PERLE.
EUGEN PERLE.
WILH. BUTTERMILCH.

Witnesses:
 EDWIN WEISS,
 ERNST WATZ.